US006730142B2

(12) United States Patent
Reyes et al.

(10) Patent No.: US 6,730,142 B2
(45) Date of Patent: May 4, 2004

(54) SEPARATION OF PROPYLENE FROM HYDROCARBON MIXTURES

(75) Inventors: Sebastian C. Reyes, Branchburg, NJ (US); Venkatesan V. Krishnan, Mount Laurel, NJ (US); Gregory J. DeMartin, Flemington, NJ (US); John H. Sinfelt, Oldwick, NJ (US); Karl G. Strohmaier, Port Murray, NJ (US); Jose G. Santiesteban, Bethlehem, PA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 10/100,978

(22) Filed: Mar. 19, 2002

(65) Prior Publication Data

US 2003/0177903 A1 Sep. 25, 2003

(51) Int. Cl.$^7$ ............................................... B01D 53/04
(52) U.S. Cl. ............................. 95/96; 95/144; 95/115; 95/902; 585/820
(58) Field of Search ................................ 95/90, 95–102, 95/115, 143, 144, 148, 902; 423/328.2, DIG. 30; 585/820; 208/310 Z

(56) References Cited

U.S. PATENT DOCUMENTS

| 4,310,440 A | 1/1982 | Wilson et al. ............... 252/435 |
| 6,200,366 B1 * | 3/2001 | Bulow et al. ................. 95/101 |
| 6,293,999 B1 * | 9/2001 | Cheng et al. .................. 95/96 |
| 6,296,688 B1 * | 10/2001 | Cheng et al. ................. 95/101 |
| 6,406,521 B1 * | 6/2002 | Cheng et al. .................. 95/98 |
| 6,488,741 B2 * | 12/2002 | Olson ......................... 95/144 |

FOREIGN PATENT DOCUMENTS

| EP | 0572239 A | * | 5/1993 |
| EP | 0943595 A1 | | 9/1999 |

OTHER PUBLICATIONS

Database of Zeolite Structures, http://www.iza-sc.ethz.ch/IZA-SC/Atlas/data/CHA.html/, 2000.*

* cited by examiner

Primary Examiner—Frank M. Lawrence
(74) Attorney, Agent, or Firm—Joseph C. Wang

(57) ABSTRACT

In a process for separating propylene from a mixture comprising propylene and propane, the mixture is passed through a bed of an adsorbent comprising a porous crystalline material having (i) a diffusion time constant for propylene of at least 0.1 sec$^{-1}$, when measured at a temperature of 373° K and a propylene partial pressure of 8 kPa, and (ii) a diffusion time constant for propane, when measured at a temperature of 373° K and a propane partial pressure of 8 kPa, less than 0.02 of said diffusion time constant for propylene. The bed preferentially adsorbs propylene from the mixture. The adsorbed propylene is then desorbed from the bed either by lowering the pressure or raising the temperature of the bed.

7 Claims, 10 Drawing Sheets

Imaginary Response Function
(AlPO-18, 423K, 8 kPa)

US 6,730,142 B2

SEPARATION OF PROPYLENE FROM HYDROCARBON MIXTURES

FIELD OF THE INVENTION

This invention relates to a process for separating propylene from mixtures of low molecular weight hydrocarbons.

BACKGROUND OF THE INVENTION

The separation of propylene from low molecular weight hydrocarbon mixtures is an extremely important and large volume operation in the chemical and petrochemical industries. Catalytic cracking and steam cracking are among the most common and large scale processes leading to these mixed hydrocarbon streams. The need to recover propylene from propane-containing streams, in particular, is one of high economic significance in the synthesis of polypropylene elastomers. However, despite the close proximity in boiling points between propylene and propane, these components are presently separated by fractional cryogenic distillation. The large size of the columns and the energy intensity of this distillation process have, however, created large incentives for alternative means of effecting these separations in a more efficient and cost-effective manner.

Some of the leading alternatives to fractional cryogenic distillation involve the use of adsorbents that exploit their ability to adsorb some of the components selectively. This has given rise to various forms of pressure or temperature swing adsorption (PSA/TSA) processes in which the mixture is first passed through an adsorbent material under conditions where one or more of the components are selectively removed. The loaded material is then typically exposed to a lower pressure and/or higher temperature environment where the adsorbed components are released and recovered at a higher purity level. Economic viability requires adsorbent materials that can deliver high selectivity, high adsorption capacity, and short duration cycles. An additional and critically important requirement is that the material should not catalyze chemical reactions that might lower the recovery of the desired components and/or render the adsorbent inactive.

Among the adsorbents which have been proposed for the recovery of propylene from hydrocarbon mixtures are ion exchange resins, mesoporous solids, activated carbons, and zeolites. Ion exchange resins and mesoporous solids usually exploit equilibrium adsorption properties in which one of the components is selectively adsorbed over suitably dispersed chemical agents. They principally rely on the adsorption affinity of cationic active centers such as Ag and Cu ions for the double bond in propylene ($\pi$-complexation). The characteristic time associated with the adsorption cycle is that required to bring the mixture close to thermodynamic equilibrium with the adsorbent. The relative rates of diffusion of the various components within the adsorbent are of secondary importance. Activated carbons and zeolites, on the other hand, typically resort to a combination of adsorption affinity and diffusion control. Two related cases of diffusion control are of interest here. In one extreme case, the separation is achieved by excluding the diffusion of some of the components into the adsorbent. The second case exploits a sufficiently large difference in diffusion rates to allow the preferential uptake of some of the components within a predetermined adsorption time. Thus, carbons are usually activated to very high surface area forms in order to provide textural properties and pore sizes that maximize adsorption while selectively controlling diffusion. Aluminosilicate and silicate zeolites have become even more attractive than activated carbons because of the ever increasing possibilities afforded by new synthetic routes, which allow for a more flexible and precise control of chemical composition, pore size, and pore volume. The tetrahedrally coordinated atoms in these microporous materials form ring structures of precise dimensions that selectively control the diffusional access to the internal pore volume.

Eight-membered ring zeolites, in particular, have been actively investigated for the separation of small molecular weight hydrocarbons because their window sizes are very comparable to molecular dimensions and because they can provide high adsorption capacities. A typical example is the Linde type A zeolite which is characterized by a set of three-dimensional interconnected channels having 8-membered ring window apertures. The effective size of the windows depends on the type of charge-balancing cations. This has given rise to the potassium (3A), sodium (4A), and calcium (5A) forms, which have nominal window sizes of about 3 Å, 3.8 Å, and 4.3 Å, respectively. Thus, for example, EP-B-572239 discloses a PSA process for separating an alkene, such as propylene, from a mixture comprising said alkene and one or more alkanes by passing the mixture through at least one bed of zeolite 4A at a temperature above 323° K to preferentially adsorb said alkene and then desorbing the alkene from the bed. EP-A-943595 describes a similar process in which the zeolite adsorbent is zeolite A having, as its exchangeable cations, about 50 to about 85% sodium ions, about 15 to about 40% potassium ions and 0 to 10% of other ions selected from Group IA ions (other than sodium and potassium), Group IB ions, Group IIA ions, Group IIIA ions, Group IIIB ions and lanthanide ions.

In zeolites, it is well-accepted that the control of window size is critically important for achieving high separation selectivities. For a given zeolite structure type, the effective size of the windows can be tuned by partially blocking or unblocking the windows with pre-selected charge-balancing cations. This provides a reasonable but not necessarily optimal control of window size because of the inherent difficulties of precisely placing these cations in a uniform manner throughout the structure. More importantly, the propensity of these cations to promote or participate in undesired reactions that may impart catalytic activity to the material can lead to detrimental oligomerization and polymerization reactions of olefins. These reactions not only lower the recovery of the desired components, they are also likely to render the adsorbent inactive. The double bonds in the olefins are particularly prone to attack even by mildly acidic sites and this may severely limit the temperature and partial pressures at which the separation process can be carried out.

In an effort to control chemical reactivity more reliably, there is a growing interest in the use of non-acidic, all-silica zeolites. Since these siliceous zeolites require no extra-framework balancing cations, the size of the windows is much more uniform throughout the crystals and largely determined by the crystal structure. Thus, for example, the potential of deca-dodecasil 3R ("DD3R") for separating propane and propylene has been very recently reported. See Zhu, W., Kapteijn, F., and Moulijn, J. A. "Shape Selectivity in the Adsorption of Propane/Propene on the All-Silica DD3R", Chem. Commun. 2453–2454 (1999). This crystalline microporous silicate has a two-dimensional pore system formed by 8-membered rings of tetrahedrally coordinated atoms with a nominal window size of 3.6 Å×4.4 Å (see Atlas of Zeolites Framework Types, Fifth Revised Edition, pages 108–109, 2001). Diffusion and adsorption measurements on this material indicate that only propylene is able to access the interior of the crystallites. The exclusion of propane was suggested as the basis for a very selective separation scheme. The size of the deca-dodecasil 3R windows, however, appears to be so close to the effective kinetic diameter of propylene that the diffusion rates are very low and this could lead to undesirably long adsorption and desorption cycles. Cycle duration can, in principle, be reduced by appropriate reductions in crystal size but such changes are not always possible with the known synthetic procedures.

The advantages of reactivity control and size exclusion afforded by materials like DD3R may not be sufficient to develop an effective separation process. The window size also has to be optimally controlled such that short duration cycles are achieved. Work by the present inventors has shown that a more optimal control of window size, with a simultaneous control of chemical reactivity, can be obtained with certain crystalline microporous materials containing phosphorous in the framework. For example, aluminophosphate AlPO-34, which is isostructural with chabazite (CHA), has pores defined by a three-dimensional interconnected channel system of 8-membered rings. Since the numbers of Al and P atoms in the unit cell of AlPO-34 are the same, there is no need for balancing cations. The lack of Brönsted acidity in this material not only permits its use as an adsorbent at higher temperatures, it also more properly tailors the size of the windows by changes in the bond angles and bond lengths of the tetrahedrally-coordinated atoms and the bridging oxygens. For example, compared to a pure silica CHA, whose pore size of 3.50 Å×4.17 Å may be too small for rapid transport of propylene, AlPO-34 exhibits a slightly larger pore size of 3.86 Å×4.18 Å. (These window size dimensions were obtained by the Distance-Least-Square (DLS) method, constraining the cell size to that measured for the material). It has now been found that this seemingly small increase in window size is critical to enhancing propylene diffusivity without appreciably enhancing propane diffusivity.

The window sizes in these phosphorous-containing materials can be further modified by suitable atomic substitutions that change bond lengths and bond angles while preserving the crystalline structure. Thus, for example, the complete replacement of Al by Ga in the synthesis mixture to give GaPO-34, which is isostructural with AlPO-34, leads to another very effective material for separating propylene from propane. Some of the advantages of AlPO-34 and GaPO-34 can also be found in AlPO-18 (AEI), which has a structure closely related to that of CHA and also comprises a three-dimensional interconnected channel system of 8-membered rings having DLS apertures of 3.61 Å×4.47 Å. Once again, unlike the situation in aluminosilicates, but similar to AlPO-34 and GaPO-34, these dimensions in AlPO-18 represent the actual size of the windows because there is no need for balancing cations.

The diffusivity of a porous crystalline material for a particular sorbate is conveniently measured in terms of its diffusion time constant, $D/r^2$, wherein D is the Fickian diffusion coefficient ($cm^2/sec$) and r is the radius of the crystallites (cm) characterizing the diffusion distance. In situations where the crystals are not of uniform size and geometry, r represents a mean radius representative of their corresponding distributions. The required diffusion time constants can be derived from standard sorption kinetics measurements as described, for example, by J. Crank in "The Mathematics of Diffusion", 2nd Ed., Oxford University Press, Great Britain, 1975 or by frequency response methods as described, for example, by Reyes et al. in "Frequency Modulation Methods for Diffusion and Adsorption Measurements in Porous Solids", J. Phys. Chem. B. 101, pages 614–622, 1997.

In accordance with the invention, it has now been found that AlPO-34 and AlPO-18 and their gallium-containing counterparts have the capability of achieving very effective separation of propylene and propane through a unique combination of diffusion time constants in which the time constant for propylene is not only much higher than for propane, but it is at the same time also high enough to permit short adsorption/desorption cycles that are economically viable.

U.S. Pat. Nos. 6,293,999 and 6,296,688 disclose the use of AlPO-14 (AFN) for separating propylene from propane. However, although AlPO-14 possesses a set of three-dimensional interconnecting 8-ring channels, only one of them seems large enough to host propylene and therefore AlPO-14 should exhibit a low propylene adsorption capacity. Moreover, with a nominal window size dimension of only 3.3 Å×4.0 Å (Atlas of Zeolites Framework Types, Fifth Revised Edition, pages 36–37, 2001), the diffusion of propylene should be slow and associated with undesirably long adsorption cycles.

SUMMARY OF THE INVENTION

According to the invention there is provided a process for separating propylene from a mixture comprising propylene and propane comprising the steps of:

(a) passing the mixture through a bed of an adsorbent comprising a porous crystalline material having a diffusion time constant for propylene of at least 0.1 $sec^{-1}$, when measured at a temperature of 373° K and a propylene partial pressure of 8 kPa, and having a diffusion time constant for propane, when measured at a temperature of 373° K and a propane partial pressure of 8 kPa, less than 0.02 of said diffusion time constant for propylene; and then (b) desorbing the propylene from the bed.

Preferably, the porous crystalline material is non-acidic.

Preferably, the porous crystalline material is selected from the group consisting of aluminophosphates, gallophosphates, galloaluminophosphates, metalloaluminophosphates and metalloaluminophosphosilicates.

Preferably, the porous crystalline material is selected from the group consisting of AlPO-34, GaPO-34, AlPO-18 and GaPO-18.

DETAILED DESCRIPTION OF THE INVENTION

Figure 1:
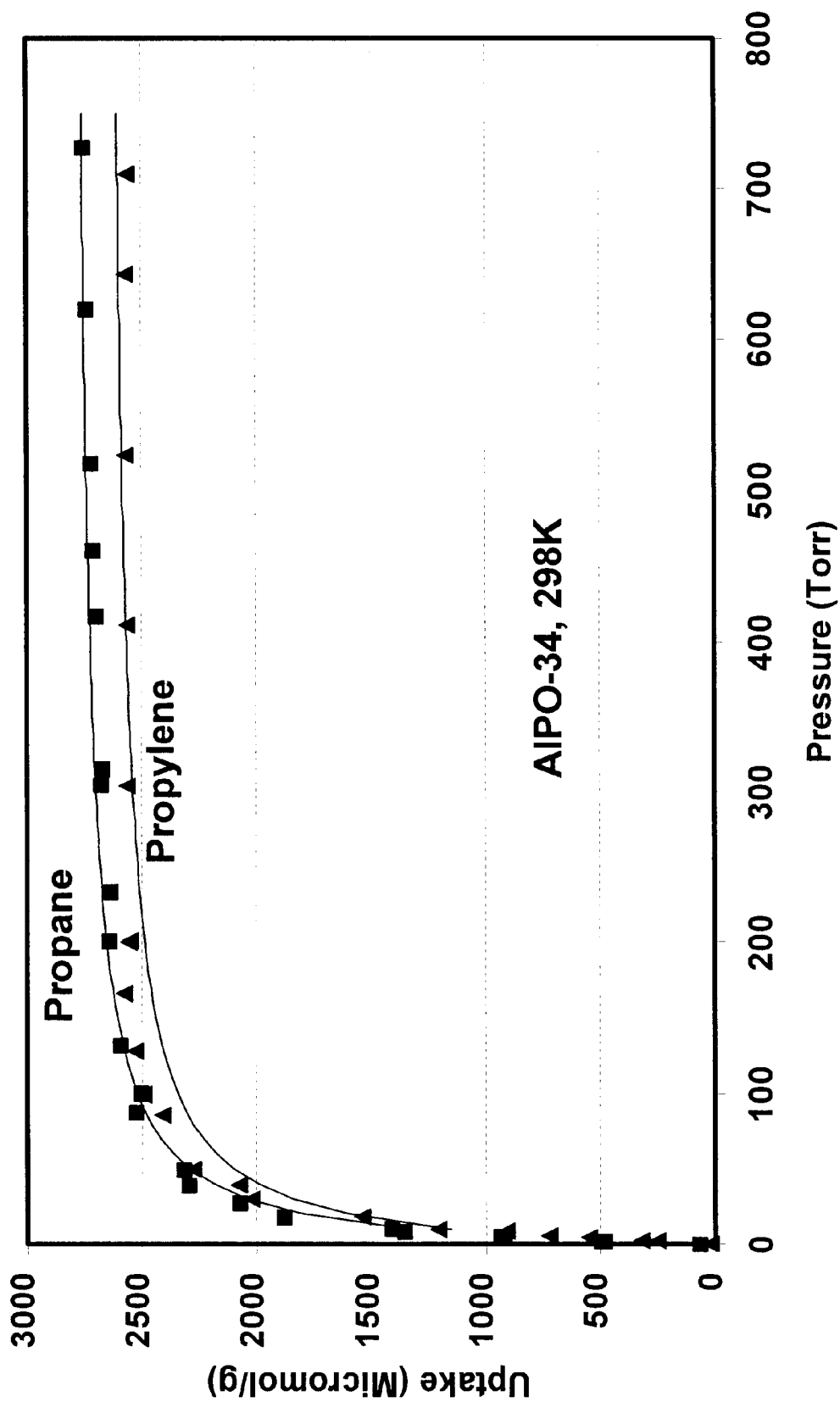
FIGS. 1 and 2 show adsorption isotherms for propylene and propane on AlPO-34 at 298° K and 373° K, respectively.

The present invention provides a process for separating propylene from a mixture comprising propylene and propane by passing the mixture through a bed of an adsorbent comprising a porous crystalline material having (i) a diffusion time constant for propylene of at least 0.1 $sec^{-1}$, when measured at a temperature of 373° K and a propylene partial pressure of 8 kPa, and (ii) a diffusion time constant for propane, when measured at a temperature of 373° K and a propane partial pressure of 8 kPa, less than 0.02 of said diffusion time constant for propylene. Using such a porous crystalline material, the bed preferentially and rapidly adsorbs propylene from the mixture. Thereafter, the propylene can be desorbed from the bed. Thus the process of the invention provides the basis for a very selective kinetic-based pressure or temperature swing adsorption (PSA/TSA) process.

Preferably, the porous crystalline material used in the process of the invention contains framework phosphorus and has at least one system of channels, each defined by an 8-membered ring of tetrahedrally coordinated atoms. More preferably, the porous crystalline material is non-acidic. Suitable porous crystalline materials for use as the adsorbent in the process of the invention include aluminophosphates, gallophosphates, galloaluminophosphates, metalloaluminophosphates and metalloaluminosilicophosphates. Particularly preferred materials include the aluminophosphates AlPO-34 and AlPO-18 and their corresponding gallophosphates GaPO-34 and GaPO-18. AlPO-34 and its synthesis are described in F. Guth, PhD Thesis, Mulhouse Univ., France (1989) or in H. Halvorsen, PhD Thesis, Univ. of Oslo, Norway (1996), whereas AlPO-18 and its synthesis are described in U.S. Pat. Nos. 4,310,440 and 4,385,994, the entire contents of which are incorporated herein by reference.

Adsorption equilibrium and diffusion studies confirm that AlPO-34 and AlPO-18 are excellent materials for separating propane and propylene. They are non-reactive, they exhibit high adsorption capacities, and they rapidly transport propylene while significantly hindering propane. However, while AlPO-34 and AlPO-18 appear to be excellent materials for separating propylene and propane, there are many other phosphorus-containing crystalline microporous materials that could deliver equal or even improved performance depending on the optimization of the PSA/TSA process. Thus, for example, one can envision process conditions in which shorter cycle times may be obtained at the expense of decreased separation selectivity (i.e., lower purity). A material with slightly greater window size could satisfy these conditions. Alternatively, if improvements in separation selectivity justify slightly longer cycle times, it may be advantageous to incorporate selected metals into the framework in such a manner that the effective size of the windows is slightly reduced. In general, the materials needed for specific situations can be optimized by suitable choices of the type of microporous structure, the framework atoms, and the type and charge of any non-framework balancing cations provided that any detrimental chemistry is avoided.

The process of the invention can be carried out in a system comprising a single adsorption bed or a plurality of adsorption beds operated either in phase or out of phase. With a system comprising a single adsorption bed or a plurality of beds operated in phase, the adsorption step must be periodically stopped to permit regeneration of the adsorbent bed(s), whereas when a plurality of adsorption beds are employed in parallel and operated out of phase, one or more beds can be in adsorption service adsorbing the desired gas component, while one or more other units are undergoing regeneration to desorb and collect the adsorbed gas component. Operation of the adsorption process of the invention is cyclical. In the preferred adsorption process, cycles are repeatedly carried out in a manner such that production of the desired product gas is substantially continuous. In the preferred embodiment, therefore, the process is carried out in a system comprising a plurality of adsorption beds arranged in parallel and operated out of phase, such that at least one bed is always in the adsorption phase while another is always in the adsorbent regeneration phase.

The process of the invention may be operated as either a pressure swing adsorption (PSA) process or a temperature swing adsorption (TSA) process. In either case, the precise steps used in carrying out the separation are not critical to the invention.

In general, the basic steps in a PSA process include an adsorption vessel pressurization step, a production (adsorption) step and an adsorbent regeneration step. During the vessel pressurization step, the pressure in the adsorption vessel in which the adsorption process is carried out is raised to the desired adsorption pressure. During the production step, a gaseous propylene and propane-containing feed is passed through the adsorption vessel at the desired adsorption pressure. As the feed gas passes through the adsorption vessel, a propylene-enriched component is adsorbed and a propylene-depleted non-adsorbed gas fraction passes out of the adsorption vessel. The bed regeneration step is carried out by reducing the pressure in the adsorption vessel so as to desorb the propylene-enriched product gas from the vessel.

The temperature at which the adsorption step of the PSA process is carried out is not critical but in general will be between about 273° K and about 523° K, or more preferably between about 293° K and about 473° K. The upper temperature is selected so as to achieve a significant loading onto the material and to avoid the possibility of any unwanted reactions, such as oligomerization and/or polymerization of the propylene. The pressures at which the adsorption and adsorbent regeneration steps are carried out are likewise a matter of choice, and in general, these steps can be carried out at any of the usual pressures employed for gas PSA processes. The pressure at which the adsorption step is carried out is determined by economics. Typically, the adsorption step is carried out at propylene partial pressures in the range of about 3 kPa to about 300 kPa, and preferably in the range of about 5 kPa to about 200 kPa. Typically, the adsorbent regeneration step is carried out at pressures in the range of about 0.1 kPa to about 10 kPa, and preferably in the range of about 0.2 kPa to about 5 kPa.

Where the process of invention is operated as a TSA process, the production (adsorption) step is carried out at a first temperature and an adsorbent regeneration step is carried out at a second higher temperature so as to desorb the propylene-enriched component adsorbed during the production step. In this case, the adsorption step is carried out at temperatures in the range of about 273° K to about 473° K, preferably in the range of about 293° K to about 423° K, while the adsorbent regeneration step is carried out at temperatures in the range of about 373° K to about 573° K, preferably in the range of about 423° K to about 523° K. The adsorption and regeneration steps in a TSA process are typically carried out at propylene partial pressures in the range of about 10 kPa to about 300 kPa, and preferably in the range of about 20 kPa to about 200 kPa.

The invention will now be more particularly described with reference to the following Examples and the accompanying drawings.

EXAMPLE 1

Figure 2:
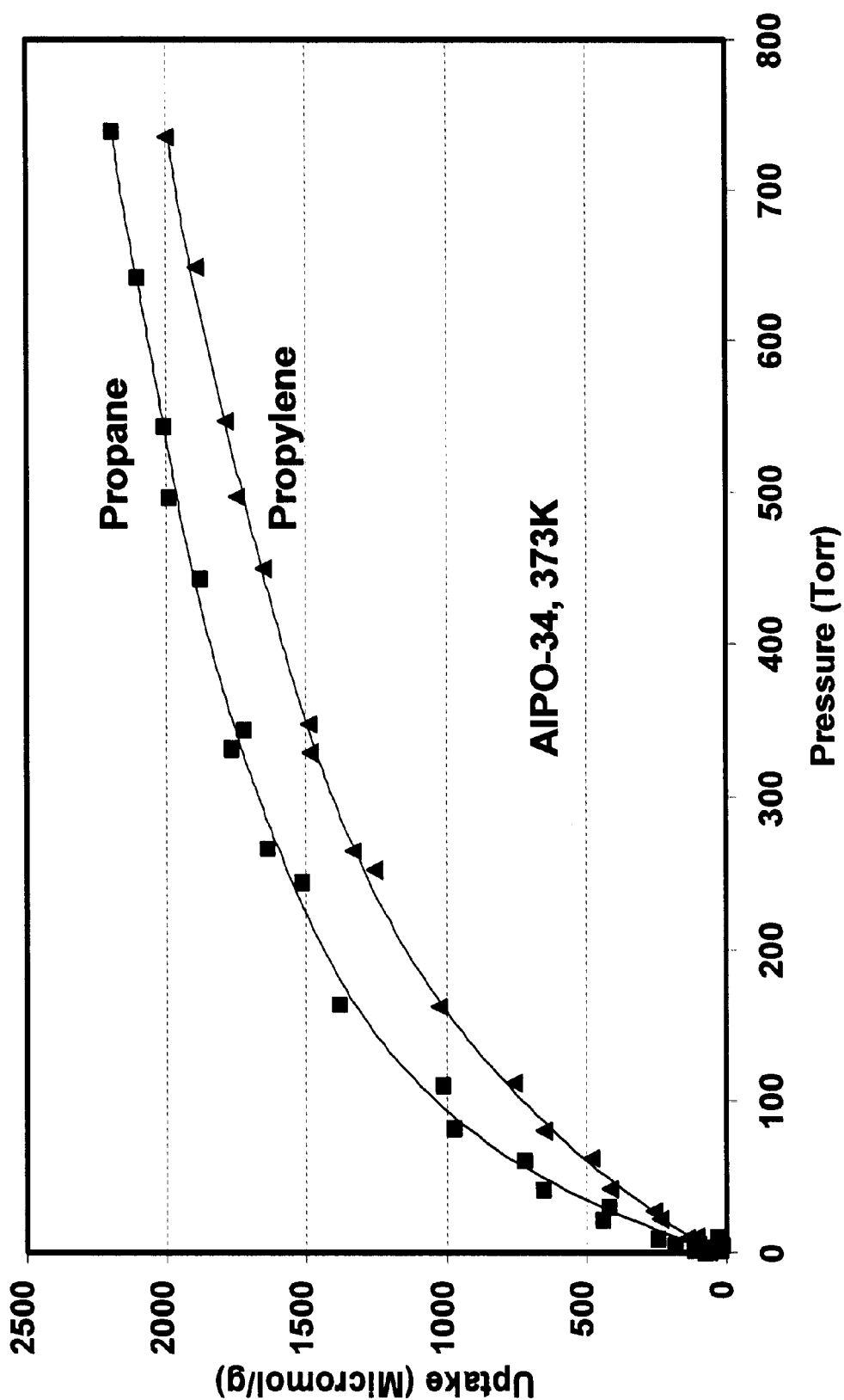

Studies were conducted on the uptakes of propylene and propane by AlPO-34 up to a pressure of 101 kPa and temperatures of 298° K and 373° K. The results are shown in FIGS. 1 and 2, from which it will be seen that the uptakes of propylene and propane are about 12 wt % and 9 wt %, respectively. The adsorption characteristics of AlPO-18 are very similar to those of AlPO-34 and total uptakes remain high even at relatively high temperatures. The similarity of the adsorption isotherms for propane and propylene strongly suggests that any separation selectivity is primarily the result of window size and molecular diameter effects instead of specific interactions with the double bond in propylene. The high adsorption capacity for propane is not a concern because the low diffusion rates limit its access to the interior of the crystals during the duration of the adsorption cycle.

EXAMPLE 2

Two independent dynamic techniques, adsorption uptake and frequency response, were employed to accurately measure the diffusion time constants of propane and propylene on AlPO-34 and AlPO-18. Typical results from adsorption uptake are presented in FIGS. 3–5 and those from frequency response are presented in FIGS. 6–10.

Figure 3:
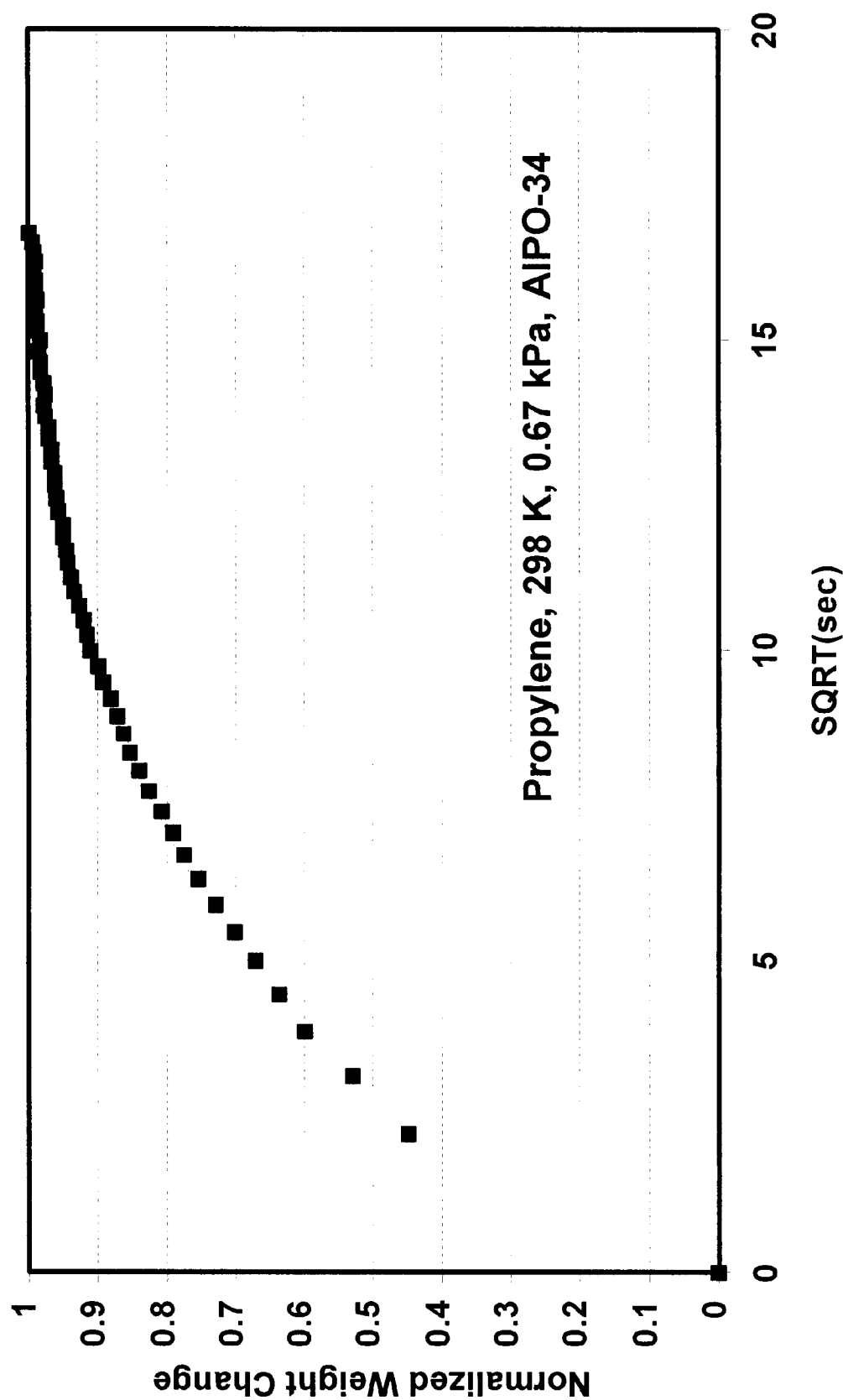
FIGS. 3–5 show adsorption uptakes for propylene and propane on AlPO-34 at 298° K and 0.67 kPa.
Figure 4:
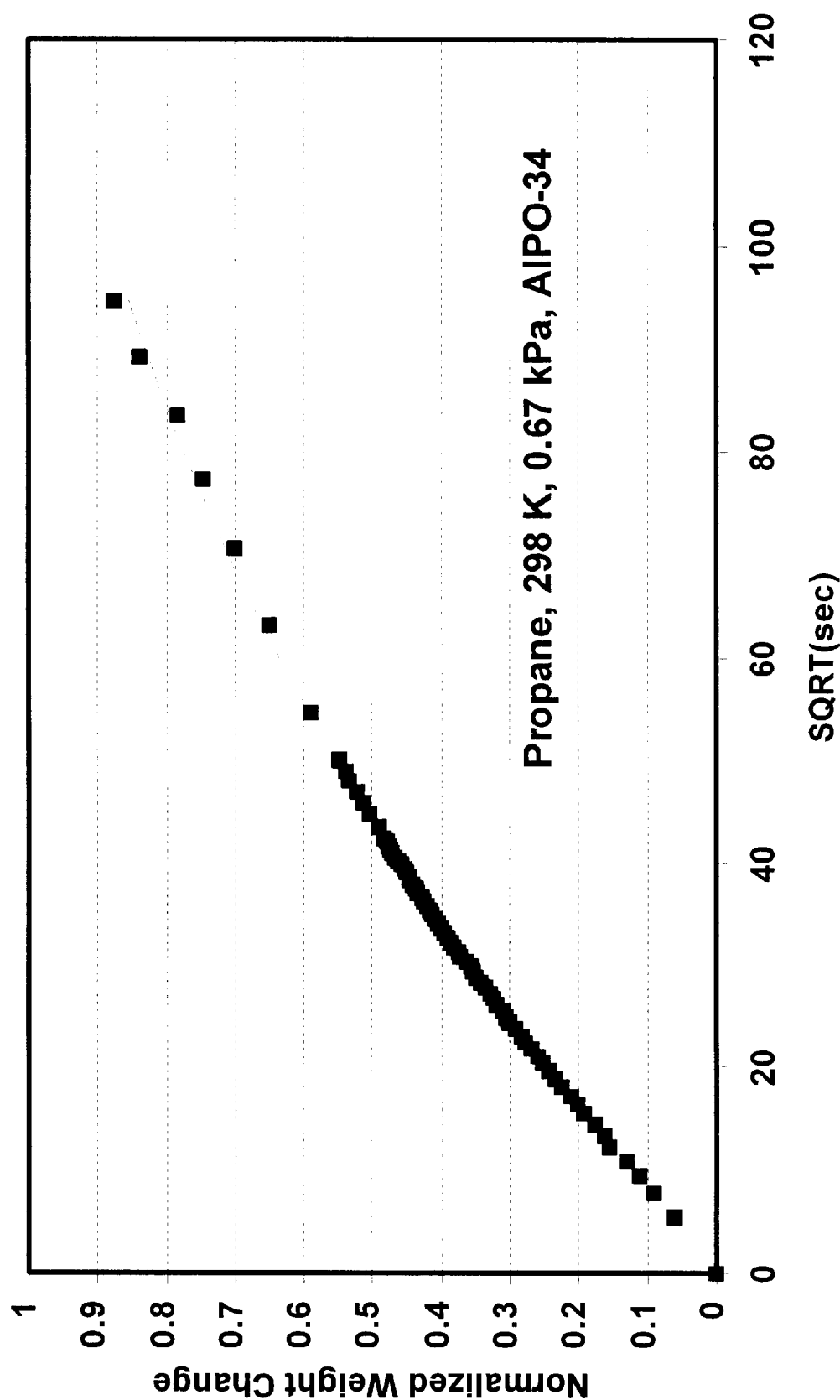
Figure 5:
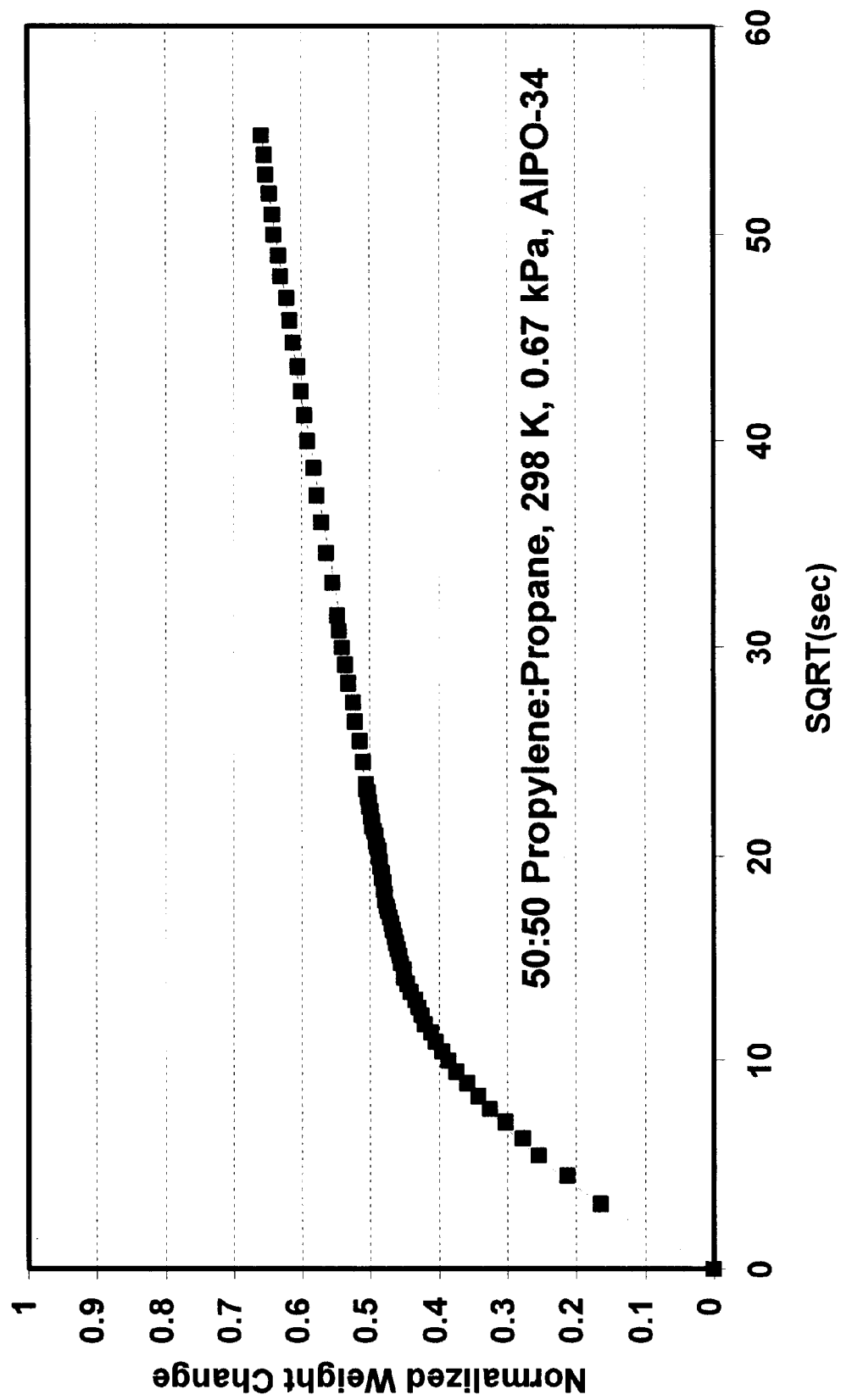

Adsorption uptake measurements for propylene and propane on AlPO-34 were carried out at 298° K and 0.67 kPa. FIGS. 3–5 display the normalized weight gain versus the square root of time ("SQRT"). The slope at early times is proportional to the square root of the diffusion time constant (see for example J. Crank in "The Mathematics of Diffusion", 2nd Ed., Oxford University Press, Great Britain, 1975). FIG. 3 corresponds to pure propylene, FIG. 4 to pure propane, and FIG. 5 to an equimolar mixture of propylene and propane. A comparison of the data in FIGS. 3 and 4 clearly implies that the diffusion time constant for propylene is much greater than for propane. Consistent with the results in FIGS. 3 and 4, the weight gain at early times shown in FIG. 5 is associated with propylene. The conspicuous break in the slope in FIG. 5 signals that propane diffuses into the crystals much more slowly than propylene. The time taken to reach the region of changing slope provides guidance on the duration of the adsorption step that is required for an effective separation scheme. The choice of this time ultimately impacts purity and recovery.

Figure 6:
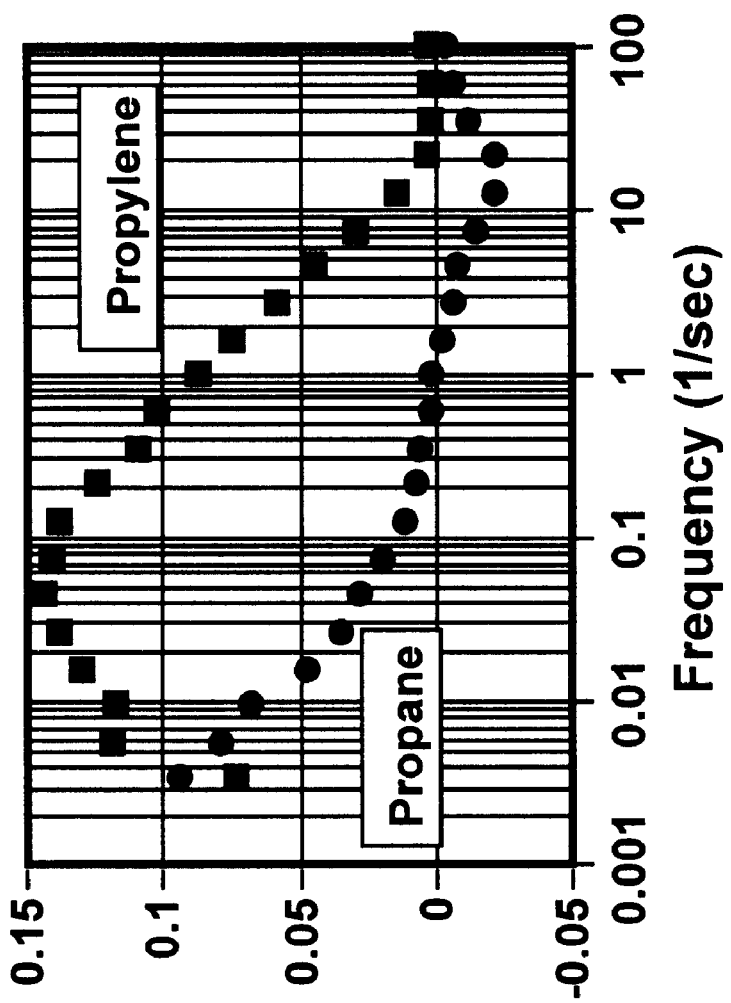
FIGS. 6–10 show frequency response measurements on AlPO-34 and AlPO-18 for propylene and propane at various temperatures and 8 kPa.
Figure 7:
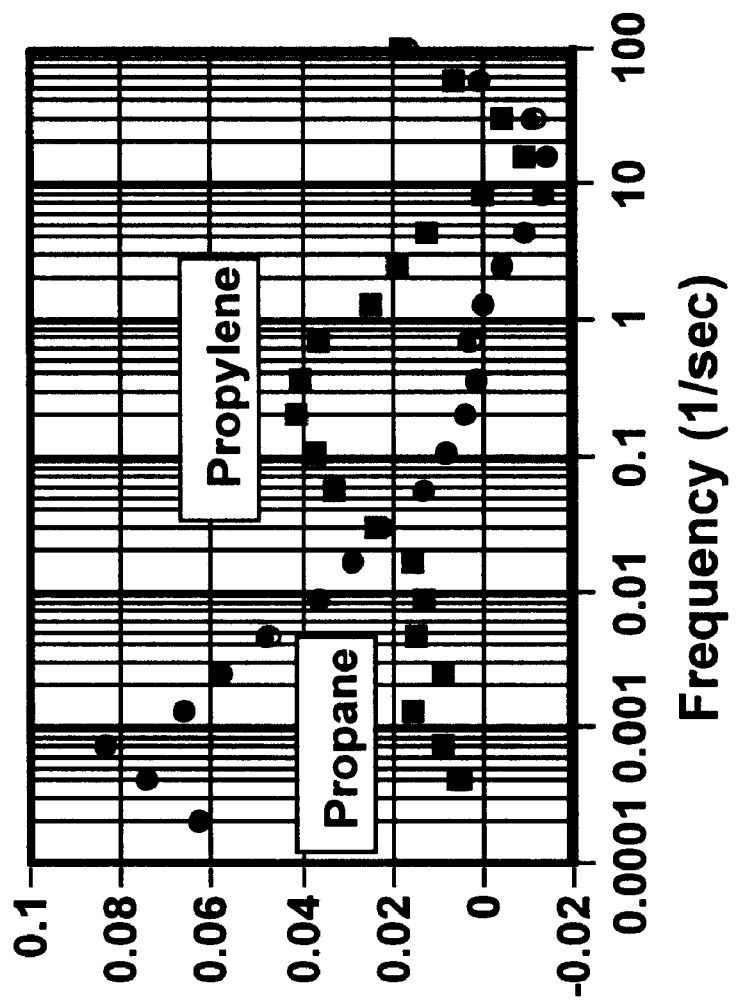
Figure 8:
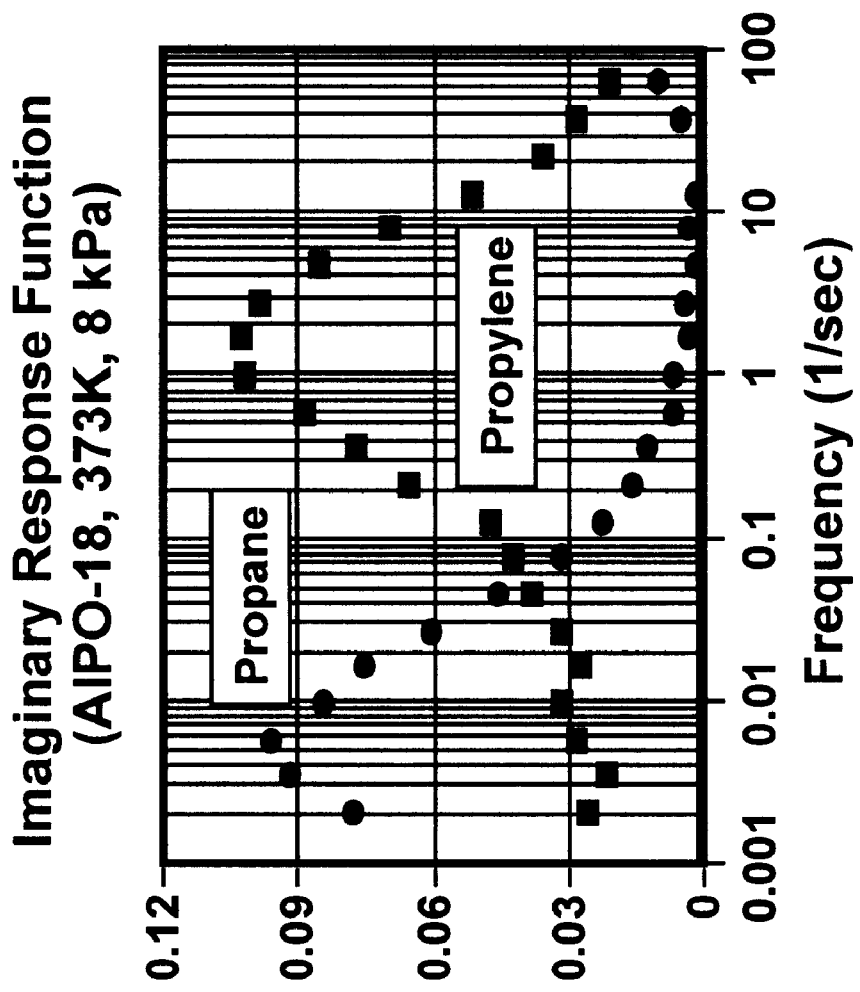
Figure 9:
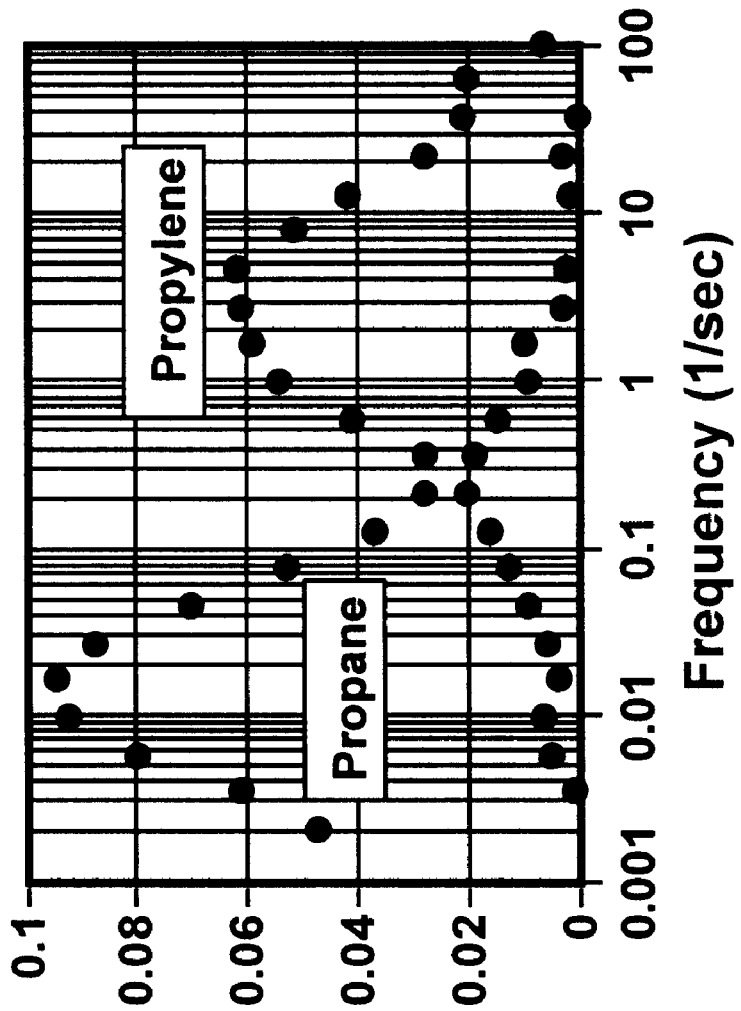
Figure 10:
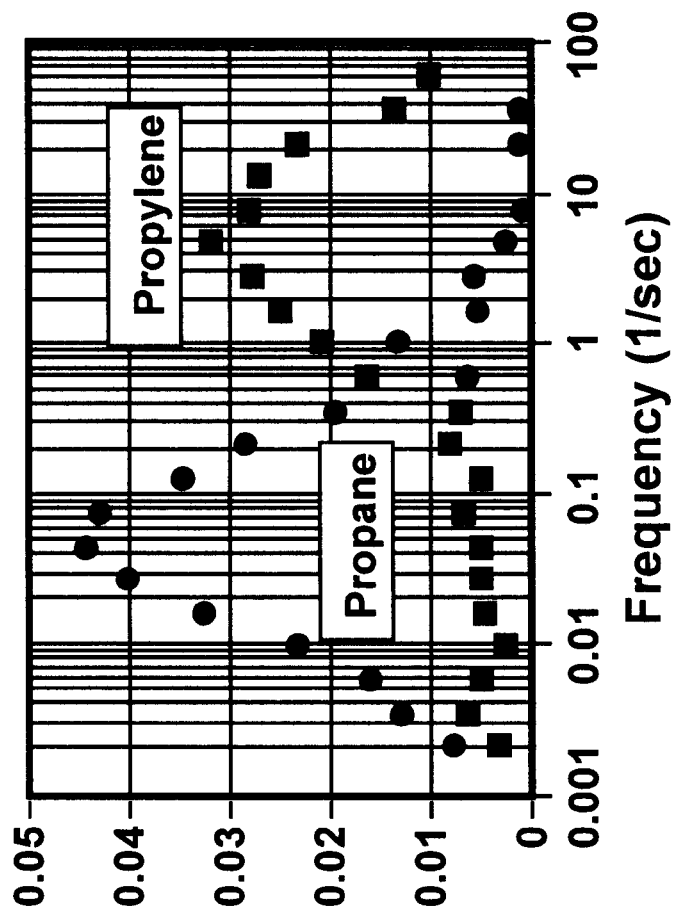

FIGS. 6–10 summarize some typical frequency response experiments for propylene and propane on AlPO-34 and AlPO-18 at 8 kPa and various temperatures. The frequency (i.e., abscissa) at which the data goes through a maximum directly gives the diffusion time constant (see for example: Reyes et al. in "Frequency Modulation Methods for Diffusion and Adsorption Measurements in Porous Solids", J. Phys. Chem. B. 101, pages 614–622, 1997). FIGS. 6 and 7 show the effect of temperature on AlPO-34 and FIGS. 8–10 show the effect of temperature on AlPO-18. These figures clearly show that the diffusion time constants for propylene are much greater than those of propane. It is also seen that at temperatures as low as 373° K the diffusion time constants for propylene are greater than about 0.1 $\sec^{-1}$.

What is claimed is:

1. A process for separating propylene from a mixture comprising propylene and propane comprising the steps of:

(a) passing the mixture through a bed of an adsorbent comprising a porous crystalline material having a diffusion time constant for propylene of at least 0.1 $\sec^{-1}$ when measured at a temperature of 373° K and a propylene partial pressure of 8 kPa and having a diffusion time constant for propane measured at a temperature of 373° K and a propane partial pressure of 8 kPa less than 0.02 of said diffusion time constant for propylene, wherein the porous crystalline material is selected from the group consisting of AlPO-34, AlPO-18, GaPO-34 and GaPO-18; and then (b) desorbing the propylene from the bed.

2. The process of claim 1, wherein the process is a pressure swing adsorption process and step (a) is effected at a propylene partial pressure in the range of about 3 kPa to about 300 kPa and step (b) is effected at a propylene partial pressure in the range of about 0.1 kPa to about 10 kPa.

3. The process of claim 2, wherein step (a) is effected at a propylene partial pressure in the range of about 5 kPa to about 200 kPa and step (b) is effected at a propylene partial pressure in the range of about 0.2 kPa to about 5 kPa.

4. The process of claim 2, wherein step (a) is effected at a temperature in the range of about 273° K to about 523° K.

5. The process of claim 1, wherein the process is a temperature swing adsorption process and step (a) is effected at a temperature in the range of about 273° K to about 473° K and step (b) is effected at a temperature in the range of about 373° K to about 573° K.

6. The process of claim 5, wherein step (a) is effected at a temperature in the range of about 293° K to about 423° K and step (b) is effected at a temperature in the range of about 423° K to about 523° K.

7. The process of claim 5, wherein step (a) is effected at a propylene partial pressure in the range of about 3 kPa to about 300 kPa.

* * * * *